US008265612B2

(12) United States Patent
Athsani et al.

(10) Patent No.: US 8,265,612 B2
(45) Date of Patent: Sep. 11, 2012

(54) POCKET BROADCASTING FOR MOBILE MEDIA CONTENT

(75) Inventors: Athellina Athsani, San Jose, CA (US); Ron Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 719 days.

(21) Appl. No.: 11/959,019

(22) Filed: Dec. 18, 2007

(65) Prior Publication Data

US 2009/0156181 A1   Jun. 18, 2009

(51) Int. Cl.
*H04M 3/42* (2006.01)
(52) U.S. Cl. ........... 455/414.2; 455/412.1; 455/414.3; 455/466; 709/203; 709/206; 705/14.4; 705/14.49
(58) Field of Classification Search ........... 455/412.1, 455/412.2, 413, 414.1, 414.2, 414.3, 414.4, 455/415, 418–420, 456.3, 466, 517, 550.1, 455/556.2, 563, 566, 567; 709/204, 206, 709/203; 705/14.4, 14.49, 14.67, 14.69
See application file for complete search history.

(56) References Cited

U.S. PATENT DOCUMENTS

| | | | | |
|---|---|---|---|---|
| 6,950,804 | B2* | 9/2005 | Strietzel | 705/26.8 |
| 7,523,507 | B2* | 4/2009 | Leinonen et al. | 726/32 |
| 7,751,805 | B2* | 7/2010 | Neven et al. | 455/414.3 |
| 7,797,287 | B2* | 9/2010 | Norton et al. | 707/692 |
| 2003/0182205 | A1* | 9/2003 | Watabe et al. | 705/26 |
| 2004/0078341 | A1* | 4/2004 | Steichen | 705/64 |
| 2007/0124208 | A1* | 5/2007 | Schachter et al. | 705/14 |
| 2008/0051071 | A1* | 2/2008 | Vishwanathan et al. | 455/414.1 |
| 2008/0096592 | A1* | 4/2008 | Waytena et al. | 455/466 |
| 2008/0186926 | A1* | 8/2008 | Baio et al. | 370/338 |
| 2008/0207233 | A1* | 8/2008 | Waytena et al. | 455/466 |
| 2008/0242317 | A1* | 10/2008 | Abhyanker | 455/456.3 |
| 2008/0291899 | A1* | 11/2008 | Gromoll et al. | 370/352 |

OTHER PUBLICATIONS

Edelman, Benjamin et al., "Internet Advertising and the Generalized Second Price Auction: Selling Billions of Dollars Worth of Keywords," Oct. 2005, pp. 1-21.
Podobnik, Vedran et al., "An Auction-based Semantic Service Discovery Model for E-commerce Applications," OTM Workshops 2006 (R. Meersman, Z. Tari, P. Herrero et al. Eds.), 10 pages.

* cited by examiner

*Primary Examiner* — Anthony Addy
(74) *Attorney, Agent, or Firm* — Frommer Lawrence & Haug LLP; Jamie L. Wiegand

(57) ABSTRACT

Storing and providing access to media content such as pictures, video, or audio at an accessible service, that can be accessed by mobile devices and wired devices using any appropriate communication protocol including message services such as SMS, MMS, IM, CHAT, and the like. Users can upload content from a mobile device or a wired device, can specify or select access and payment/monetization options that are to apply to the uploaded content, and can download content that was provided by other users and subject to various download/payment terms. Free access can be accompanied or followed by advertising. Content can be converted into and/or provided in different formats and resolutions. In addition, key words and optionally short codes can be associated with specific content examples to improve ease and accuracy of upload and download.

17 Claims, 7 Drawing Sheets

POCKET BROADCASTING FOR MOBILE MEDIA CONTENT

FIELD OF ART

The present invention relates generally to storing and searching data and, more particularly, but not exclusively to storing and accessing media content such as video via a mobile device.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, accessing multimedia content, in particular video content, remains cumbersome. For example, while there is an increase in the functionality of mobile phones, including the advent of high speed "third generation" (3G) networks, the vast majority of phones around the world rely upon a set of discrete applications to Find, Use, Save, and Share media. For example, to view mobile video on demand, one must typically launch a mobile web browser or media browser, navigate to the desired video, then select a video for viewing. Typically, this sequence will result in the launching of a media player application which downloads the video and plays the resulting stream, typically encoded using encoding methods such as "3GP," a variant on the MPEG-4 encoding standard. (http://en.wikipedia.org/wiki/3GP) Note that this method is also used to initiate audio media as well, such as internet radio stations encoding using 3GP. An example is SomaFM.com, where various streams can be accessed via a Wireless Application Protocol (WAP) mobile web page where a link to a 3GP stream may be found. While this does work, it constrains the user to using a mobile phone as if it were a desktop computer, with web or web-like navigation and button pressing required to view media.

Thus, access to media, whether to upload or download, can be cumbersome for users to obtain and/or evaluate. For example, some mobile devices have a limited keypad, a small screen, and/or limited text based message capabilities. Such devices may be more convenient for the user to send relatively short text based messages, such as Short Message Service (SMS) messages, Instant Messaging (IM) messages, Chat, email, or the like. Even with more capable wired or wireless devices, it is typically time-consuming for a user to manually open a browser, navigate to a search service, submit search terms, and navigate forward and backward through the listed search results.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
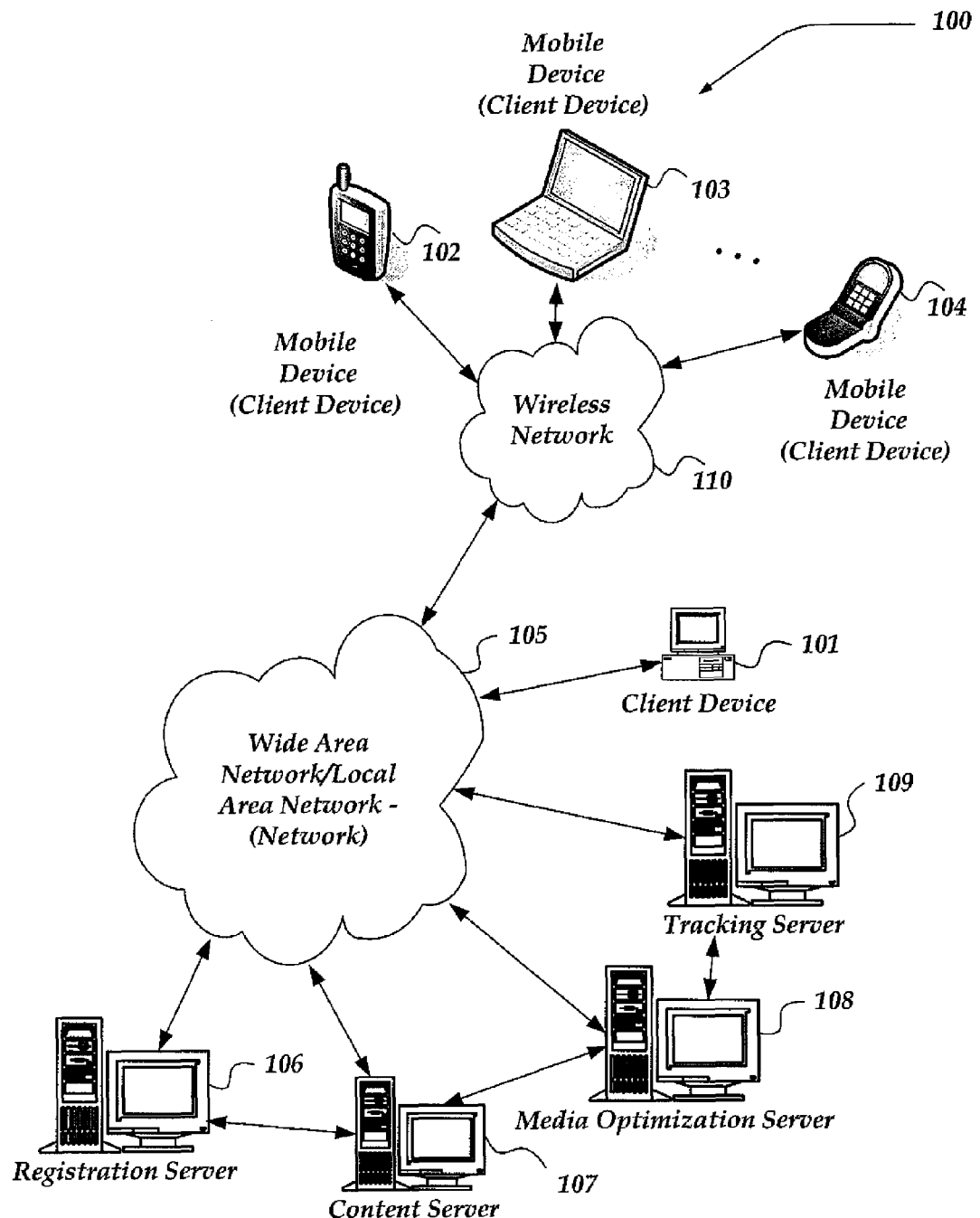
FIG. 1 is a system diagram of one embodiment of an environment in which the invention may be practiced.

Example embodiments of the present invention now will be described more fully hereinafter with reference to the accompanying drawings, which form a part hereof, and which show, by way of illustration, specific embodiments by which the invention may be practiced. The invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods and/or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As noted above, while there is an increase in the functionality of mobile devices, including the advent of high speed wireless networks, the vast majority of such devices around the world rely upon a set of discrete applications to Find, Use, Save, and Share media. For example, to view video on demand for a mobile device, one must typically launch a mobile web browser or media browser, navigate to the desired video, and then select a video for viewing.

Typically, this sequence will result in the launching of a media player application which downloads the video and plays the resulting stream, typically encoded using encoding methods such as "3GP," a variant on the MPEG-4 encoding standard. Note that this method is also used to initiate audio media as well, such as internet radio stations encoding using 3GP. An example is SomaFM.com, where various streams can be accessed via a Wireless Application Protocol (WAP) mobile web page where a link to a 3GP stream may be found.

While this does work, it constrains the user to using a mobile device as if it were a wired desktop computer, with web or web-like navigation and button pressing required to view media. Such usage modes do not contemplate or meaningfully address the mobile device user experience, where users may have a short time to find and access media; where they may wish to do so in a variety of locations and settings; where they are using a device with relatively limited interface capabilities, and where the triggering event or call to action evoking a desire to experience media content may be found in the user's ever-changing physical surroundings.

Moreover, users in huge numbers share their media interests or choices with others, and this market interest is unserved by the current art. Users may forward a WAP page to a friend, but this is a laborious process that ignores the inherent messaging capabilities of a mobile phone, such as the SMS (Short Message Service) message (also known as a "text" or "texting"), of which billions are sent worldwide on a daily basis.

Apart from the occasional web-to-SMS link delivery method, a need exists to meaningfully integrate SMS with mobile media to effectively encompass the functions of Find, Use, Save, Share in the context of mobile experience. In addition, publishing media to the mobile networks for easy Find, Use, Save, Share access by others is severely limited by the current art. At best, one can upload video to a website, where it is transcoded and listed in a WAP page a user must navigate to. Saving media is currently an unmet need in the current art. A mobile video, for example, may include several megabytes of data, a memory requirement exceeding by far the vast majority of mobile phones presently deployed in the global market. Bookmarking WAP pages may be accomplished, but this can be unreliable and laborious, as page contents change over time, and the save format can be indirect and non-descriptive. A need exists to have a collection of media in an easily accessible, "file-like" storage and access mode on mobile phones.

In addition, monetization for mobile media is often rooted in legacy media distribution models, most typically the cable television model. One subscribes to "channels" of mobile media (usually video) and pays, for example, per month per channel. Thereafter, the user is authorized to browse to the channel and view the current offerings. While this addresses Find and Use, it does not address Save and Share.

For example, if one were to share such media offerings, the recipient would be required to subscribe to a mobile media service prior to viewing any video, and also would be required to pay for the entire channel offering before viewing the single originally video shared by the sender. This media subscription model can be inimical to advertising, an effective way of delivering monetized content to users. Few users (as the premium cable channel market has shown) are willing to pay for access to a premium content channel and also agree to be shown advertising.

Relatively rich media at retail points of sale can be useful, for example where customers may be considering a purchase, and desire detailed information about a considered product. In the absence of a knowledgeable salesperson (or instead of a salesperson) a user may browse the mobile internet for information. Highly targeted, mobile media content can provide a user with easily understood audiovisual information about the product, either from the manufacturer, or from a trustable 3rd party that earns its revenues through advertising, on a fee basis, or through some other means. Though the hardware, media production and formatting, and network capabilities exist to deliver valuable consumer services such as these, the current art in mobile media, particularly around highly targeted media invocation and delivery on demand, typically does not deliver the required functionality. Networked media is becoming more and more prolific, along with mobile device media playback and high speed delivery capabilities, yet known methods for finding, getting, saving, and sharing mobile media are often grounded or stalled in an outdated paradigm of web browsing, and lack meaningful advertising and monetization capabilities that take advantage of—or even address—the nature of the mobile device experience.

Accordingly, as will be described again in the Generalized Operation section further below, example embodiments of the present invention make mobile media content broadcasting and consumption easier by delivering integrated mobile-aware Find, Use, Save, and Share functionality to users. In addition, advertisers can easily create mobile media marketing campaigns, content creators can enjoy new forms of monetization, and mobile operators can deploy new revenue-generating services, and end users can get rich media information about products and services they find in any venue or physical location where they may use their phones. Users—commercial or consumer—can easily publish media to mobile phone networks across carrier customer bases using a Pocket Broadcast TV System (PBTS) in accordance with example embodiments. The self-service functionality of the PBTS can enable a user to function as a broadcaster and advertisers to a global audience currently running in the hundreds of millions worldwide. There are a number of applications and embodiments possible using embodiments of the current invention, as will be described herein.

In example embodiments described herein, users can "Find" by sending a query and receiving in response to the query a link or other access to the desired content (e.g., mobile media content) indicated by the query. For example, the user can send a message such as a text message to a specific address such as an email address or SMS short code, and receive in reply a message or other communication including a link or other mechanism or information that enables access to the desired content, and/or including part or all of the desired content. Information such as one or more search terms or keywords in the message can be used to identify the content. In an example embodiment, the address to which the user sends the message can uniquely identify content. In another embodiment, a combination of the address to which the user sends the message and information identifying the user and/or the user's location or other demographic information can uniquely identify content. Alternatively or additionally, different techniques can be used to locate and/or identify content. One or more keywords and an address that together uniquely identify content or a class of content can be provided to the user via an advertisement, or in response to a user's query to a search engine, and so forth. In example embodiments described herein, users "Use" content by viewing and/or listening to it, or otherwise consuming it. In example embodiments described herein, users can "Save" the content by copying it to a storage, by copying or storing access information for the content (e.g., thereby saving the content by reference) such as by storing a message including a link to the content, and/or by otherwise preserving the content and/or access information for the content. In example embodiments, the user can "Share" the content (e.g., mobile media content) by forwarding (manually or automatically) to one or more friends or colleagues a message or other communication that includes a link or other mechanism or information that enables access to the content, and/or includes part or all of the content. In an example embodiment, the access terms for the friends or colleagues to the shared content can be different from access terms to the content for the sharing user. For example, access information provided by or on behalf of the user to the user's selected friends or colleagues can enable access for a limited time period and/or enable a limited number of accesses to the content, and/or can enable the friends or colleagues to access the content at a reduced rate or cost (which can be borne by the friends or colleagues and/or by the user), and so forth.

In an example embodiment a central service or PBTS (Pocket Broadcast TV System) provides one or more interfaces or virtual locations, or similar or different types, for uploading content from client devices such as mobile devices, managing or constraining use or distribution of the uploaded content, and downloading content from the central service, thus providing integrated and comprehensive services with reliable and robust data storage so that central service or PBTS users can easily upload, distribute, and download/view mobile videos. In example embodiments, this system allows easy broadcasting of uploaded media, automatic conversion/optimization of uploaded file(s) (format, size, and so forth), and enables uploaded media to be associated with key words or other indices/indicia, with a short code, or associated with a combination of key word(s) and short code.

In an example embodiment, a content contributor uploads content to the central service, and provides additional information to identify the content and establish terms relating to download by others of the content.

The content contributor can first register with the central service or PBTS, for example via an exchange of messages with the service. A server of the service can save the registration information and a corresponding user profile in a database, and can return login/password information or other access or identification keys to the registering content contributor. In an example embodiment the service can also provide the contributor (e.g., a premium contributor) with an address such as a short code, email address, abbreviated email address or the like for the contributor to use when uploading content to the service. In an example embodiment, the address is unique to the contributor. Alternatively the address can be used by one or more contributors, and/or can be associated with a class or type of media to be uploaded (e.g., different addresses for video and audio, different addresses for different content such as sports, politics, art, and so forth).

In an example embodiment, registration is not necessary, or can be optional. For example, where the contributor desires no compensation or consideration for uploaded content, registration can be waived or declined. Different levels of registration can also be applied, for example more or less information can be required from a user or contributor depending on the nature or complexity of a relationship between the contributor and the central service or PBTS.

Following registration, a user or contributor can upload media content captured with a mobile device (in an example embodiment, video being captured in real time) or other media content (e.g. audio content, visual content, or a combination thereof), to a server of the central service, and can provide information to identify the media content, (e.g., a short code, one or more keywords, or combination thereof). The information can include one or more unique identifiers for the content. Thus the user or contributor can provide details relating to the content such as user-generated key words, tags, description or classification, title, and so forth. The user or contributor can also interact with a server of the central service to edit the uploaded content, change its format, change or specify a resolution or size of the content that should be saved, and so forth. Although not limited, the mobile media content can include, an image, video, illustration, graphic, narrative, document, or audio file.

The user can also select among various costs or monetization options and enter or update payment information, near the time the content is uploaded, or at a later time. The user or contributor can select default options that will apply to all uploads, or can specify options each time that content is uploaded, or can decide whether to allow default options to apply or modify/specify options for particular content. Example options can include a price paid by a user seeking to download the content, for example where the download fee is based on a size of the download, a fixed fee, as part of a subscription (with a royalty or per-download reward paid to the contributor by the subscription service), free (e.g. in conjunction with mandatory advertising or not), and so forth. Other example options include situations where the content is advertising content and the contributor pays to have the central service or PBTS place the content before other users, for example using keyword auctions such as GSP (generalized second price) auction mechanisms or other auction mechanisms that can be for example dynamically applied or calculated at delivery time, or otherwise pays for the download instead of the downloading user, and so forth. In addition, the contributor can additionally or alternatively select a group of users that the contributor desires to have free access to the content, where either the contributor pays for this service on behalf of the group he or she selects or otherwise provides value to the central service in exchange for this capability or service (e.g., allows the central service to share the content in some form with other users to attract advertising revenue or otherwise monetize the content with the provider's consent). The content or access information for it can be pushed to the group, or otherwise made available to the group members, and the group can be specified or redefined at any appropriate time. For example, the user can enter a list of contacts (email, phone number, names, and so forth), the contacts can be drawn from an address book/database associated with the contributing (or a purchasing) user, or the user can open a Bluetooth™ connection that the central service can use to forward keyword/short code information regarding the content.

The central service or PBTS can also push the uploaded content or media file to all appropriate locations based on the providing user's and/or the service's tagging and labeling of the media and expressed user preferences. For example, the providing user can designate social networks or accounts to which the content should be registered or reflected, and can designate virtual mailboxes or other storage facilities within or independent from the central service to which the content should be sent or delivered. For example, the content can be stored in a database of the central service or PBTS and be retrievable there-from via web page, email request, SMS/MMS request, and so forth; and/or can be sent to networked locations such as the user's mobile/virtual storage place of choice, social networking web sites, sent to a user's email address(es), instant messaging accounts, and so forth. The central service or PBTS can also assign a unique keyword to an assigned mobile short code so that when that keyword is sent to that short code, a message will be returned with a link or other connection to the content. Alternatively, mobile short code can be assigned or dedicated to the content, for either a finite or indefinite period of time.

In an example embodiment, the central system or PBTS tracks all access or activities relating to the content, for example to implement monetization or analysis, or otherwise gather useful information regarding the content.

In example embodiments, the content can be accessed and viewed in different ways. For example, a user can send a request (e.g., an SMS message to a particular short code and containing a keyword) to the central service and in response receive an SMS/MMS notification message that, when opened, opens to an MMS file playing the video directly; or opens to reveal a link to a WAP page at which or from which the video can be viewed; or opens to reveal a regular URL which can be visited to view the requested or pushed video content. In example embodiments, for free downloads, a user can get direct access to the files. In this case, the user makes a selection, the PBTS server taps into a corresponding database and serves the file to the server and the server delivers the file to the user in a default file format or in a file format specified by the user. For non-free downloads, the user can be prompted to enter user profile information to help the system determine how to charge the user. If the user is not on a subscription-based plan, the user can be prompted to enter payment information. The payment information can be calculated based on estimated stream requirements or based on video size; can be a per-set fee per video; and so forth, and the user can be prompted to enter credit card information, or a form of virtual cash transaction. If payment information is already saved or on record with the central service or PBTS, then user can simply authorize a transaction. The PBTS server can tap into the database, review or assign any applicable DRM/copyright information for the paid file, and serve the file to the user in the desired file format. For example, where access is free, a link can be provided that can be freely shared with other users. In another embodiment, where the content is being rented or otherwise paid for, a provided link can be exclusive to the purchaser and invalid for other users.

Communications between the central service or PBTS system and the clients such as mobile devices can be in the form of, and/or conveyed via, a text message, a Short Message Service (SMS) message, an Instant Message (IM), Multimedia Messaging Service (MMS), Wireless Access Protocol or Wireless Application Protocol (WAP), or other communication protocol, or speech that is received and/or variously processed or converted into corresponding text or alphanumeric characters, phonemes, Unicode, or other representations, and so forth. Other messaging technologies can be used alternatively or additionally, such as relay chat and email.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and network devices or servers. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, and servers 106, 107, 108, 109. The central service or PBTS system mentioned elsewhere herein can for example include or be implemented via one or more of the servers 106-109.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. Such mobile devices may include a messaging client that enables a user to send and receive limited size text messages, but may not enable a user to send or receive long messages, graphics, images, or other content.

In another example, a web-enabled mobile device may have a touch sensitive screen, a stylus, and several lines of color LCD display in which both text and graphics may be displayed. A web-enabled mobile device may include a messaging client and a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to exchange text messages that include search queries and search results. A user may also employ a browser application to access additional search result content that is identified in one or more text messages.

Mobile devices 102-104 and client device 101 also may include at least one client application that is configured to provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to search server 106, client device 101, or other computing devices.

In one embodiment, mobile devices 102-104 and the client device 101 may also provide a physical location to another computing device. In one embodiment, however, mobile devices 102-104 may provide the physical location information in terms of coordinates such as latitude and longitude, or the like. However, mobile devices 102-104 may also provide other information that may be employed to determine a physical location of the device, including for example, a cell tower address, a MAC address, IP address, an area code of a telephone number associated with the mobile device, a physical location of a wide area network or local area network of which the devices 101-104 are a member or participant, or the like. Such location information can be provided in a separate message, sent as part of another message (for example, a query or request from the mobile device for a service), or even as a combination of the above. In one embodiment, physical location information can be provided on demand, or based on a time period (e.g. periodically upon expiration of a recurring or changeable time period), an event, or the like.

Mobile devices 102-104 and client device 101 may further be configured to include a client application that enables the end-user to log into an end-user account that may be managed by another computing device, such as one or more of the servers 106, 107, 108, 109. Such end-user account, for example, may be configured to enable the end-user to send/receive SMS messages, IM messages, emails, access selected web pages, participate in a social networking activity, perform search queries, or the like. However, performing search queries, participation in various social networking activities, or the like, may also be performed without logging into the end-user account.

Client device 101 may include virtually any computing device capable of communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like. Client device 101 may include a messaging system and/or interface for sending or receiving text messages with mobile devices 102-104 or other client devices.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include cellular networks, mesh networks, Wireless LAN (WLAN) networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies voice or data communications, including data communications that only allow text messaging. Technologies may also include 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple servers 106, 107, 108, 109 and their respective components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one or more of the servers 106, 107, 108, 109, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media. Computer-readable instructions, data structures, program modules, or other data can be fixed or stored in various storage media, for example Read Only Memory, Random Access Memory, Dynamic Random Access Memory, cache memory, magnetic storage media such as floppy discs or magnetic tape, DVDs, CDs, flash memory, and so forth. The modulated data signal and carrier-wave signal mentioned above can be fixed or stored in such storage media.

One embodiment of a server that can function as one or more of the servers 106, 107, 108, 109 is described in more detail below in conjunction with FIG. 3. Briefly, however, such a server may include any computing device capable of connecting to network 105 to enable data searching, filtering, sorting, and other data management operations. Such a server may also provide network portal information and/or services, including providing content and tracking users online behavior with their permission. Such a server may further enable aggregation and management of social networking information. Devices that may operate as one or more of servers 106, 107, 108, 109 include personal computers desktop computers, multiprocessor systems, microprocessor-based or programmable consumer electronics, network PCs, servers, and the like.

In an example embodiment, the registration server 106 receives requests from users via client devices (mobile or otherwise) to establish an account including a profile of the user with a media access service, and upload content such as video content to be associated with the account. The content server 107 stores and provides access to the uploaded content, the media optimization server converts the uploaded content into different formats and/or resolutions and can store the converted content, and the tracking server monitors access to the uploaded content, to enable or provide monetization and/or accounting functions.

Although FIG. 1 illustrates each of servers 106, 107, 108, 109 as a single computing device, the invention is not so limited. For example, one or more functions of each of the servers 106, 107, 108, 109 may be distributed across one or more distinct computing devices. For example, managing searches, search results, SMS messages, Instant Messaging (IM) sessions, email messages, sharing of contact information, collecting behavior information, aggregating and/or storing of social networking information, or the like, may be performed by a plurality of computing devices, without departing from the scope or spirit of the present invention.

In an example embodiment, the functions of the tracking server 109, the media optimization server 108, the content server 107, and the registration server 106 can be consolidated in a single server, or can be variously distributed among multiple servers. In an example embodiment, the servers 106, 107, 108, 109 can provide access to a variety of content and/or other data that may be useable on mobile devices 102-104 and/or on client 101. Such content may include text content, web content, audio content, video content, FTP data, or the like. Data services may include, but are not limited to SMS, IM services, email services, services, web services, third-party services, audio services, video services, VOIP services, calendaring services, photo services, or the like. Moreover, information about the content and/or services variously provided by the servers 106, 107, 108, 109 may be employed to provide results to a query or request from the mobile devices 102-104 and/or the client 101.

In an embodiment of the invention, queries for upload or download of content can be sent from any of the devices 102, 103, 104, 101 to the content server 107 for processing. The server 107 can include a database to be searched, or can identify an appropriate remote database that is likely to contain the desired information. For example, the database can be located in or accessed by a different, remote server such as the server 108 or other server, and in that case the server 107 can communicate with the server 108 to query the database and then return information to the device that originally sent the query. A reply to the querying device can be sent from the server 108, or directly to the querying device from the server 107. In an exemplary embodiment where the queries are sent via SMS (Short Message Service) to a particular SMS short code (which can for example be associated with specific and/or general databases or services), the mobile device can communicate directly or indirectly with a server that can then communicate via an SMS gateway with a backend service, which can in turn access a database (for example using information supplied within or with the SMS message) and then return search results back through the chain. For example, the search server 107 can be such a server that communicates with an SMS gateway via a backend service, and so forth.

Illustrative Mobile Device Environment

Figure 2:
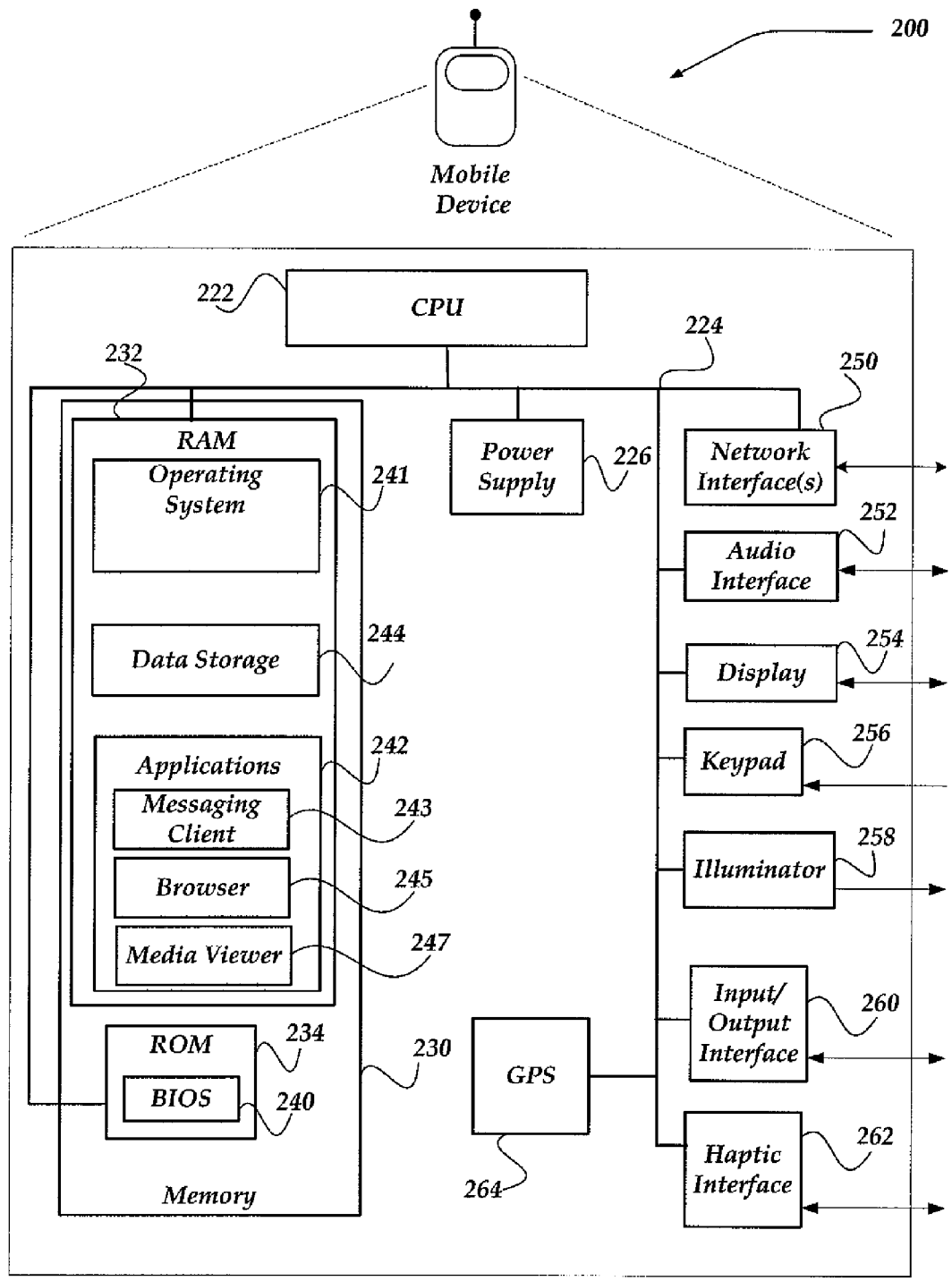
FIG. 2 shows one embodiment of a mobile device that may be included in a system implementing the invention.

FIG. 2 shows one embodiment of mobile device 200 that may be included in a system implementing one or more embodiments of the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in FIG. 2, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), GPRS, SMS, WAP, user datagram protocol (UDP), transmission control protocol/Internet protocol (TCP/IP), general packet radio service, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial pad. Keypad 256 may also include a keyboard or command buttons that are associated with taking and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions. In another embodiment, illuminator 258 may comprise a flash for a built-in camera (not shown).

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS) or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, the mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory may also store an operating system 241 for controlling other operations of mobile device 200. It will be appreciated that this component may include a specialized client communication operating system such as Windows Mobile™, or the Symbian® operating system, or a general purpose operating system such as a version of UNIX, or LINUX™. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a message or part of a header during a communication, sent upon request, or the like. Moreover, data storage 244 may also be employed to store search data, user preferences, address books, buddy lists, aliases, social networking information, or the like. At least a portion of the information may also be stored on a disk drive or other storage medium (not shown) within mobile device 200.

Applications 242 may include computer executable instructions which, when executed by mobile device 200, provide a plurality of services, including contact managers, task managers, calendars, games, VOIP applications, transcoders, database programs, word processing programs, security applications, spreadsheet programs, and so forth. Applications 242 generally include a messaging client 243 that causes mobile device 200 to transmit, receive, and/or otherwise process messages (e.g., SMS, MMS, IM, email, and/or other messages), audio, video, and enable telecommunication with another user of another client device.

Another example of application programs includes a browser 245, which may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

Another example of application programs includes a media viewer application 247, which can include virtually any application configured to receive and display graphics, text, multimedia, and the like, in particular video according to different formats and files.

In one embodiment, messaging client 243 or browser 245 may be configured to enable access to a search application, such as might be available through the servers of FIG. 1. In one embodiment, a user of mobile device 200 may input to the search application a variety of search terms for use in obtaining a search results. Mobile device 200 may also provide location information, or information useable in determining its physical location. Such information, may, in one embodiment, be useable to automatically (e.g., transparent to a user input) modify the search query.

In accordance with exemplary embodiments, messages regarding upload or download of content to or from the central service or PBTS can be sent via SMS to a specific or general SMS short code (e.g. via the messaging client 243), or can alternatively be provided to a database through any other communication application and corresponding protocol(s) of the mobile device 200, including for example the browser 245.

Illustrative Network Device Environment

Figure 3:
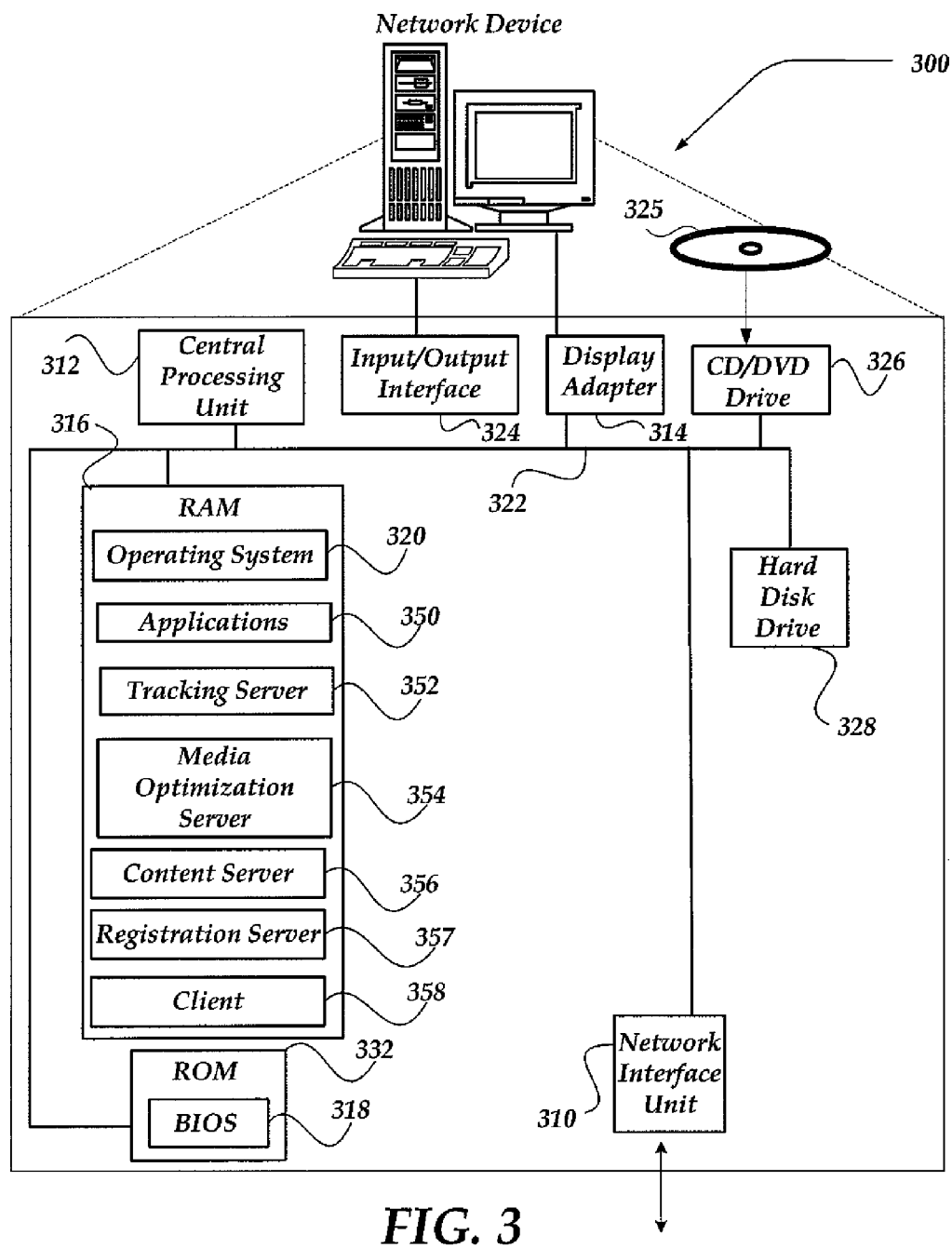
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, search server 106 and/or content server 107 of FIG. 1.

Network device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of processor-readable media, storage media. Storage media may include volatile, nonvolatile, removable, and non-removable media implemented in any method or technology for storage of information, such as computer readable instructions, data structures, program modules, or other data Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include SMS message servers, IM message servers, email servers, transcoders, schedulers, calendars, database programs, word processing programs, HTTP programs, customizable user interface programs, IPSec applications, encryption programs, security programs, VPN programs, account management and so forth. A tracking module 352 may also be included as an application program within applications 350 or as a separate application, for example to perform the functions of tracking server 109.

The mass memory can also include content server software 356 (e.g., an application program within applications 350 or as a separate application), for example so that the network device 300 can perform as, or perform functions of, the content server 107 shown in FIG. 1. The software 356 can be configured to receive search terms from client devices, determine other search parameters, perform searches of data sources, provide search results, and perform other search related operations relating to accessing content, e.g. uploading content to or downloading content from the server. The module 352 may employ a process substantially similar to that described below. The mass memory can also include media optimization and registration software modules 354, 357 for performing the functions of servers 108, 106.

The mass memory can also include a client module 358, for example so that the network device can perform as, or perform the functions of, the client device 101 shown in FIG. 1.

Generalized Operation

As noted herein, exemplary embodiments are directed to a system and method for uploading, storing, and accessing media content such as video, for example providing a central system that stores the content and provides access to it to clients such as mobile devices or other devices. The features variously described below and elsewhere herein can be performed using the apparatus shown in FIGS. 1-3, and can be variously implemented in the exemplary processes shown in FIGS. 4-7 and described further below.

Communications between the central system and the clients can be in the form of, and/or conveyed via, a text message, a Short Message Service (SMS) message, an Instant Message (IM), Multimedia Messaging Service (MMS), Wireless Access Protocol or Wireless Application Protocol (WAP), or other protocol, or speech that is received and processed into corresponding text or alphanumeric characters, and so forth. For example, other messaging technologies can be used alternatively or additionally, such as relay chat and email.

As noted further above, example embodiments of the present invention make mobile media broadcasting and consumption easier by delivering integrated mobile-aware Find, Use, Save, and Share functionality to users. In addition, advertisers can easily create mobile media marketing campaigns, content creators can enjoy new forms of monetization, and mobile operators can deploy new revenue-generating services, and end users can get rich media information about products and services they find in any venue or physical location where they may use their phones. Users—commercial or consumer—can easily publish media to mobile phone networks across carrier customer bases using a Pocket Broadcast TV System (PBTS) in accordance with example embodiments. The self-service functionality of the PBTS enables any user to function as a broadcaster and advertisers to a global audience currently running in the hundreds of millions worldwide. There are a number of applications and embodiments possible using embodiments of the current invention, as will be described herein.

In particular, in an example embodiment a central service provides a single interface or virtual location for uploading content from client devices such as mobile devices, managing or constraining use or distribution of the uploaded content, and downloading content from the central service, thus providing integrated and comprehensive services with reliable and robust data storage so that PBTS users can easily upload, distribute, and download/view mobile videos or other mobile media content. In example embodiments, this system allows easy broadcasting of uploaded media, automatic conversion/optimization of uploaded file(s) (format, size, and so forth), and enables uploaded media to be associated with a short code, or associated with a combination of key word(s) and short code.

In an example embodiment, a content contributor uploads content to the central service by first registering with the service, for example via an exchange of messages with the service. A server of the service can save the registration information and a corresponding user profile in a database, and can return login/password information to the registering content contributor. In an example embodiment the service can also provide the contributor (e.g., a premium contributor) with an address such as a unique short code for the contributor to use when uploading content to the service. Registration can optionally be omitted, where for example the contributing user is already known to the system, or all or some of the registration information is not needed (e.g. where the contributing user provides the content with no strings or obligations attached, where anonymity of the contributing user is desired, and so forth).

Following registration (or absent registration when it is not required), a user or contributor can upload captured video or other mobile media content (or, in an example embodiment, video or other content being captured in real time) to a server of the central service, and can provide a unique identifier to identify the media content (e.g., a short code, a keyword, or combination thereof). For example, where different (and optionally unique) short codes are available, the user can select or rent/purchase one and associate it with the content, or can also select a keyword or other identifier so that a combination of short code and keyword(s) uniquely identifies the content. Instead of short codes, short email addresses can be used. The user or contributor can also provide additional detail such as user-generated key words, tags, description or classification, title, a format and/or size of the content, and so forth. The user or contributor can also interact with the server of the central service to indicate a present format of the content, edit the uploaded content, change its format or indicate desired format(s) in which the content should be made available to (different) downloading users, change or specify one or more resolutions or sizes of the content that should be saved on the central service and/or provided from central service, and so forth. The contributing user can also indicate different payment or download terms for different formats, sizes, and so forth.

The contributing user can also select among various costs or monetization options and enter or update payment information, near the time the content is uploaded, or at a later time. Example options can include a price paid by a user seeking to download the content, for example where the download fee is based on a size of the download, a fixed fee, as part of a subscription (with a royalty or per-download reward paid to the contributor by the subscription service), free (e.g. in conjunction with mandatory advertising or not). Other example options include situations where the content is advertising content and the contributor pays to have the content placed before other users, for example using auctions such as GSP (generalized second price) auction mechanisms, or otherwise pays for the download instead of the downloading user, and so forth.

In example embodiments, the network operator can optionally apply charges to the contributing user for upload and/or for distribution functions. Charge options can for example be based on one or more of a size of the upload, a fixed fee, as part of a subscription, per-upload, per-download by other users, or can be free (or selectively waived with purchase of advertising), and so forth. In example embodiments, the network operator can both charge the contributing user, and compensate the contributing user. For example, the contributing user can pay the network operator to receive the content and then distribute or advertise it on a promotional basis, and then the contributing user can receive payment from (or share revenue with) the network operator when consumers pay to download or purchase the content following the promotion.

In addition, the contributing user can in example embodiments select a group of users that the contributor desires to have free access to the content, where either the contributor pays for this service on behalf of the group he or she selects or otherwise provides value to the central service in exchange for this capability or service (e.g., allows the central service to share the content in some form with other users to attract advertising revenue or otherwise monetize the content with the provider's consent). The content or access information for it can be pushed to one or more individuals or one or more groups of individuals or other entities, or otherwise made available to group members, and each group can be specified or redefined at any appropriate time. For example, the user can enter a list of contacts (email, phone number, names, and so forth), the contacts can be drawn from an address book/database associated with the contributing (or a purchasing) user, or the user can open a Bluetooth™ connection that the central service can use to forward keyword/short code information regarding the content. This can be done before content is uploaded, at or near the same time the content is uploaded, or any time after the content is uploaded. The pushing can be done at or near the time the content is uploaded, or can be done at a later time specified by either the uploading contributor or the central service or PBTS system, and can also be staggered or spaced out over time. For example, the uploading user can designate individual times for each other user (e.g. near birthdays of the other users), near calendar events such as holidays, and so forth. This function could also be used by the uploading contributor and/or the central service for advertising purposes or in a methodical fashion to generate interest in the content and/or the contributor.

For example, a contributing or content-owning user such as an advertiser can communication with the central service or PBTS via messaging or alternatively through a web portal or webpage, to upload content such as video, provide one or more tags such as "element", a subject e.g. "Element", (e.g., relating to an Element™ automobile made by Honda™), also provide text that should be provided in a message that includes the content such as "See the new 2007 models now!", and can specify a video delivery fee, e.g., $0.36 per delivery, and can specify whether this fee is to be paid by the advertiser and/or the viewer (e.g. by the advertiser, or if the content is entertaining in its own right then perhaps alternatively or additionally by the viewer at a rate that will not dissuade viewers).

If the video or other content was previously uploaded, the contributing user or content owner can for example select it from among a library of content to associate one of the content files or videos with the tag and message text. The designation of the video or other content (either to be uploaded, or previously uploaded) can indicate a location or source of the content, in other words can indicate where the central service can find it or obtain it, for example by transferring it from another server within or outside the central service. For example, the designation can indicate a location of the content on a hard drive or other data storage of the user's mobile device or desktop computer, a location and/or other identifier of content within the central service or PBTS system that was previously uploaded, a third party location or source (e.g., a URL with any necessary access or password information, and so forth).

A preview option can also be provided, to enable the advertiser or contributor to confirm or check the designated content.

Thus, when a client user sends a message to the central service that contains the tag "Element" (and optionally a short code or other message address associated with the content, e.g., "pckt@mac.com"), then the central service or PTBS will send a reply message to the client user that includes the title "Element", the message text "See the new 2007 models now!", and a link, e.g. an executable link, to play the associated video or other mobile media content. For example, the link can include or specify a WAP/web page where the mobile media content or another link to it may be found.

In exemplary embodiments, keyword combinations provided in combination with message addresses or short codes by client users seeking access to content such as video content, can indicate an advertisement or venue where the client user observed the suggestion or advertisement for the content. For example, a keyword combination of "hybrid bb" can indicate the user observed the keywords (and optionally an associated short code) listed on a highway bill board and desires information about hybrid vehicles, whereas a keyword combination of "hybrid show" can indicate that the user observed the keywords while watching a broadcast television program. This origin information can be useful, for example, not only to gauge or tailor the provided content to the user's circumstance and location, but also to gather information regarding effective marketing techniques and facilitate appropriate billing or monetization. Product packages, newspapers or magazines, and other locations or sources of information can also be identified in similar fashion, and can for example help indicate preferences of the user. For example, if a source is identified as a sports car magazine, information regarding the product can emphasize performance or other characteristics that a sports car enthusiast might appreciate, whereas a different source might suggest that the user would appreciate information with a different emphasis for example cost-effectiveness, environmental impact of the product, and so forth. In addition, in some embodiments a keyword can be "owned" by a provider or advertiser (e.g., within a specific subject area and/or geographic area). In some embodiments, keywords can be resolved to indicate different content depending for example on additional factors such as a user's preferences (observed or explicitly stated, for example in a user profile maintained by the central service or PTBS), the user's physical location, demographic information regarding the user and/or the physical location, and/or on static or dynamic results of an auction process in situations where multiple advertisers are relevant, and so forth. This information can also suggest other products or advertisements that the downloading user may be interested in, which can be incorporated into the download or provided thereafter.

The central service or PBTS can also push the uploaded content or media file to different and multiple locations, services or entities based on the contributing or providing user's and/or the service's tagging and labeling of the media and expressed user preferences. For example, the providing user can designate social networks or accounts to which the content should be registered or reflected, and can designate virtual mailboxes or other storage facilities within or independent from the central service to which the content should be sent or delivered. For example, the content can be stored in a database of the central service or PBTS and be retrievable there-from via web page, email request, SMS/MMS request, and so forth; and/or can be sent to networked locations such as the user's mobile/virtual storage place of choice such as Xdrive account, social networking web sites (e.g. uploaded to a Facebook PBTS application or account), sent to a user's email address(es), instant messaging accounts, pushed to other accounts or addresses associated with other users designated by the uploading user, and so forth.

The central service or PBTS can also assign a unique keyword to an assigned mobile short code so that when that keyword is sent to that short code, a message will be returned with a link or other connection to the content. Alternatively, a mobile short code or other address or access-enabling identifier can be assigned or dedicated to the content, for either a finite or indefinite period of time. In an example embodiment, the network operator can optionally monetize unique keywords for each content, for example by charging contributing users or content owners for unique keyword(s) associated with their content.

In an example embodiment, the central system or PBTS tracks all access or activities relating to the content, for example to implement monetization, analysis, or otherwise gather useful information regarding the content.

In example embodiments, the content can be accessed and viewed in different ways. For example, a user can send a request (e.g., an SMS message to a particular short code and containing a keyword) to the central service and in response receive an SMS/MMS notification message that, when opened, opens to an MMS file playing mobile media content such as video directly; or opens to reveal a link to a WAP page at which or from which the content can be viewed; or opens to reveal a regular URL which can be visited to view the requested or pushed content. Alternatively, the user can select from different options including: free; prepaid; subscribed; pay for mobile videos; infomercials; videos; music videos; movies; Alternate Gaming Reality content; games; and so forth, for example from a menu list via a browser or via a mobile Internet menu. The content can be downloaded or provided in different ways, for example with a reply message to the requesting user that includes a link to a URL or WAP page from which the content can be downloaded (e.g., streamed, downloaded in whole, and so forth), with establishment of a streaming connection, with password or other access information to unlock or access locally stored content, a bar-coded coupon that can be redeemed at a brick and mortar or virtual point of retail sale, and so forth.

In example embodiments, for free downloads, a user can get direct access to the files. In this case, the user makes a selection, the PBTS server taps into a corresponding database and serves the file to the server and the server delivers the file to the user in a default file format or in a file format specified by the user. For non-free downloads, the user can be prompted to enter user profile information to help the system determine how to charge the user. If the user is not on a subscription-based plan, the user can be prompted to enter payment information. The payment information can be calculated based on estimated stream requirements or based on size of the mobile media content; can be a per-set fee per video; and so forth, and the user can be prompted to enter credit card information, PayPal™ information, or other form of virtual cash transaction. If payment information is already saved or on record with the central service or PBTS, then user can simply authorize a transaction. The PBTS server can tap into the database, review or assign any applicable DRM/copyright information for the paid file, and serve the file to the user in the desired file format. For example, where access is free, a link can be provided that can be freely shared with other users. In another embodiment, where the content is being rented or otherwise paid for, a provided link can be exclusive to the purchaser and invalid for other users. For example, for a user that receives content in connection with a premium SMS fee or account, the provided link to the content can be disabled for sharing, for example by providing the link as a unique URL string that is assigned to one user and maps to receipt of the SMS used by the user to invoke or request the content. The content can be anything that the user desires to view, including but not limited to music video, TV, film, animations, mobile episodes of TV programs, sports information or shows, news updates, legal notices, political information, and so forth. The central service or PBTS can also be used to implement private distribution networks or channels, with varying or desired degrees of data protection, encryption and restricted access. For example, a contributing user can be a company that desires to transmit confidential business information to employees, customers or business partners, receive information from designated sources or the public (e.g. news networks or agencies receiving news reports from freelance journalists, eyewitnesses or bloggers), and so forth.

Where media content is provided "free" of charge to requesting users, such content can be uploaded to the central service or PBTS at any time via the world wide web and/or via mobile phone, and can by dynamically assigned unique keywords by the central service or PBTS, for example randomly, by category or indicated content, and/or based on an identity or other characteristic of the provider who uploaded the content, and so forth. The central service or PBTS can also permit the uploading user or provider to designate multiple recipients or groups to which the content should be forwarded or made available. In an example embodiment, this free content can be monetized by following up any request for the content with a second message that contains an advertisement (which can be related or unrelated to content of the requested content) and revenues relating to the advertisement provide the monetization.

With respect to advertiser operations, the central service can allow for bulk loads for large advertising campaigns, and can provide flexible options to advertisers. For example, an advertiser can provide several free downloadable games, mobile videos, ARGs (Alternate Reality Games), and/or other media of interest to users with the caveat that the users have to view advertisements prior to, during, and/or after viewing of the media. These advertisements can be static media, mobile video, links to WAP/web sites, and so forth.

In sum, monetization can include subscription service, per download/upload service, serving advertisements in connection with free content, and SMS keyword bidding on the central service or PBTS system. Example embodiments can also include interactive viral mobile marketing campaigns, PBTS short code keyword bidding, and where SMS search models are available (e.g. Google Mobile) also SMS keyword bidding where advertisers pay to be sponsors of SMS search returns or the like.

Other novel uses will be appreciated. For example, storytelling can be performed with mobile media using principles described herein, including simulated interactive conversation with non-player characters (e.g. in ARGs) where a user provides keywords and the non-player character automatically responds to the keywords. When a user provides a request that does not contain keywords or does not contain recognized keywords, the system can respond (e.g. by sending an SMS) with video or other media links that approximate a best-guess response, based on other information (e.g., keywords similar to unrecognized terms in the request or query, user profile information, a random sampler of video associated with a short code included in the message or message address, and so forth).

Figure 4:
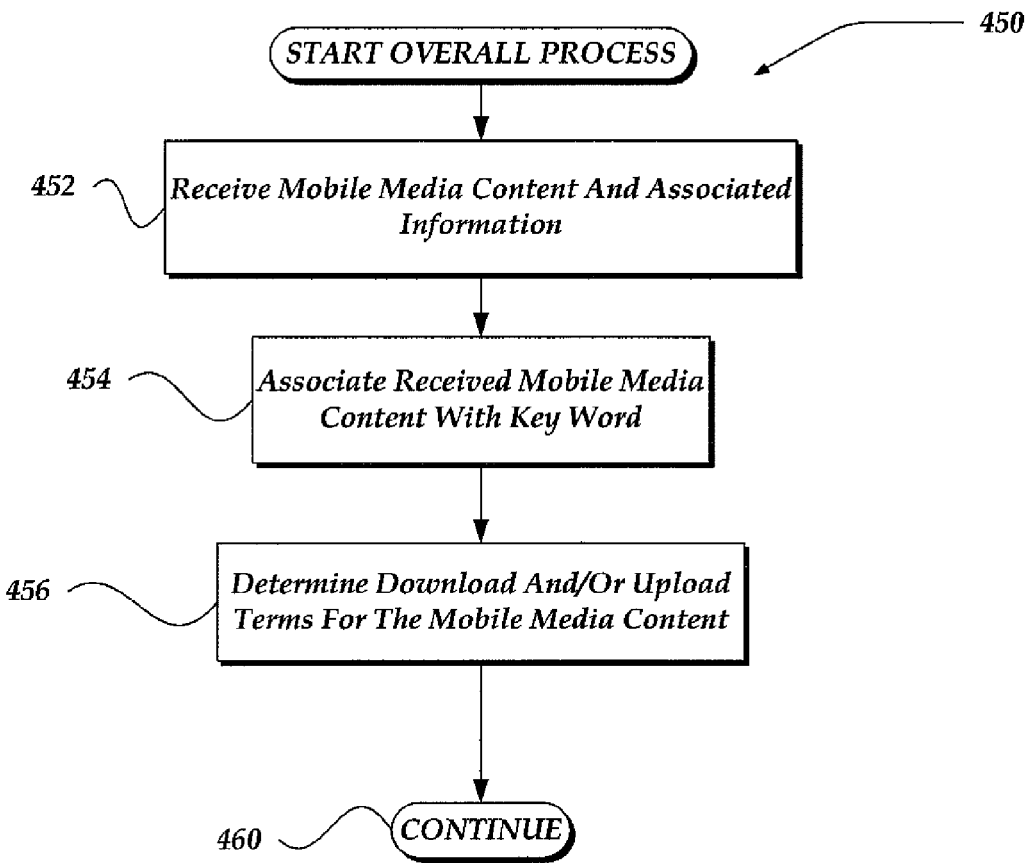
FIG. 4 illustrates a logical flow diagram generally showing one embodiment of an overall process for receiving and providing content such as video through a messaging system.

FIG. 4 illustrates operation of certain aspects of the invention and shows a logical flow diagram of an exemplary process 450 that encompasses various aspects and features of the invention described herein. Control begins and moves to block 452, where mobile media content such as video content and associated information are received, for example from a client device such as a mobile device by a server in a central service or PBTS system. The associated information can include, for example, information regarding the content, such as descriptive information, tags, keywords, identifiers and/or short code or short email provided or suggested by the contributor uploading the content, and so forth. For example, as described elsewhere herein, the associated information can include text to be included in a reply message with the content when the content is requested by or provided to another party through the central service or PBTS system, can indicate a desired payment scheme or download charge for the content, can indicate one or more destinations to which the content should be forwarded (e.g., to other users or groups, to repositories within and/or without the PBTS system that are accessible to the user contributing the content and/or other entities, and so forth).

Control proceeds from block 452 to block 454, where the received content is associated with one or more key words. This association can be performed using one or more key words provided by the same user who uploaded the content, and/or can be provided by the central service or PBTS system, for example based on subject matter of the uploaded content, based on an identity or behavior pattern of the uploading user, based on random selection, based on sequence of receipt, and so forth.

Control proceeds from block 454 to block 456, where download and/or upload terms for the content are determined, for example based on the associated information provided by the uploading user (who can for example enter or specify among payment or financial arrangement options such as pay-per-download, free download with rights of advertisement granted to the central service/PBTS system, and so forth as described herein). Terms for related issues such as advertising, distribution and so forth can also be determined in block 456. Control then proceeds from block 456 to block 460, where the process continues, for example by returning to block 452 or branching elsewhere.

Figure 5:
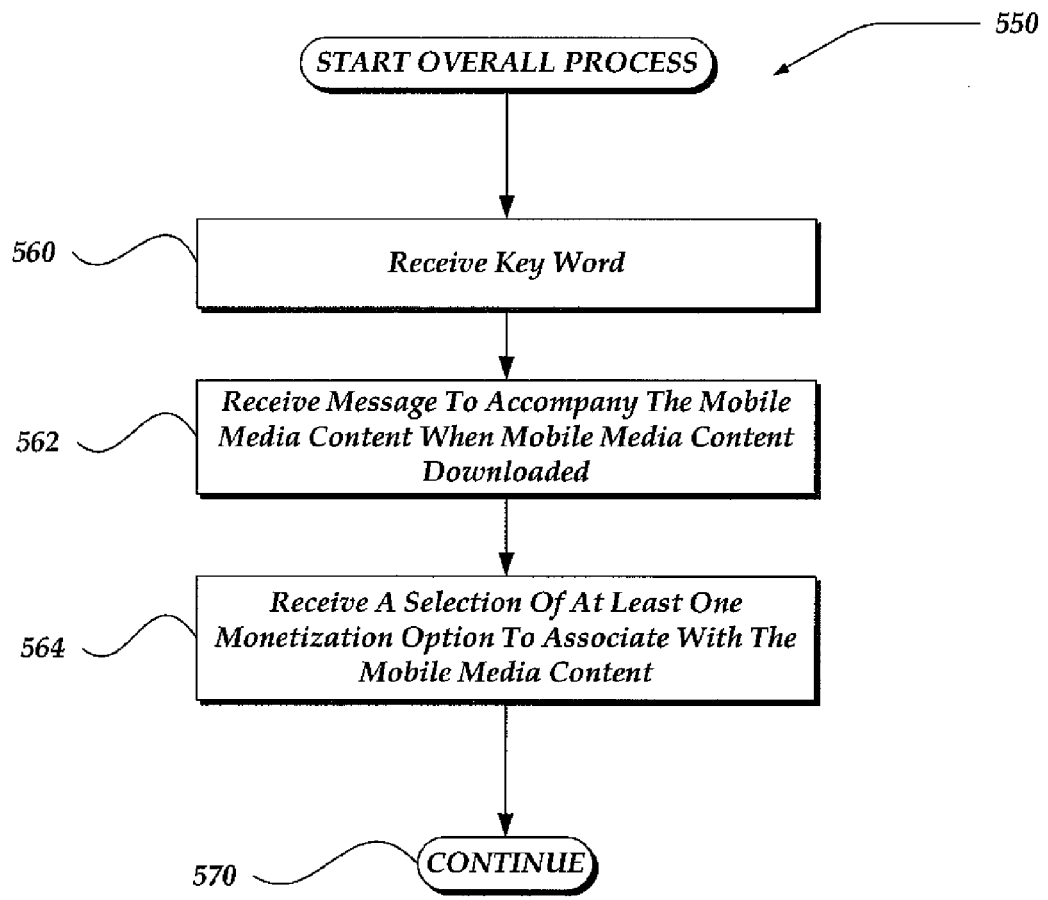
FIG. 5 illustrates a logical flow diagram generally showing example functions that can be performed in connection with block 452 of FIG. 4.

FIG. 5 illustrates example functions that can be performed in connection with block 452 of FIG. 4. In particular, FIG. 5 illustrates information that can be received from the uploading user and included, for example, in the "associated information" of block 452.

As shown in block 560 of FIG. 5, the central service or PBTS system can receive one or more key words with the associated information received from the uploading user. Control proceeds from block 560 to block 562, where a message is received, that should accompany the mobile media content or link to the content when it is provided to a user requesting download or access to the content. This message can, for example, form an advertisement or exhortation, can describe content of the media content, can provide instructions relating to viewing or handling of the media content, and so forth. Control proceeds from block 562 to block 564, where the central service or PBTS system receives an indication or selection of at least one monetization option to associate with the mobile media content. This indication or selection can include a selection or indication of download terms and/or related payment options that the uploading user desires to be applied when another user request download of or access to the media content. The indication or selection of one or more monetization options in block 564 can additionally or alternatively include an indication or selection of terms relating to one or more of upload, distribution, and advertising, and so forth, wherein for example the uploading user pays the central service for specific functions or privileges and/or shares revenue with the central service. Details of such terms and payments are described elsewhere herein, and it will be recognized that various selections and combinations of different terms and methods are possible, including for example different payment or access terms for different users or groups of users (e.g., those personally known to or specifically designated by the uploading user, and all remaining users in another, different group). Control then proceeds from block 564 to block 570, where the process continues, for example by returning to block 560 or branching elsewhere.

Figure 6:
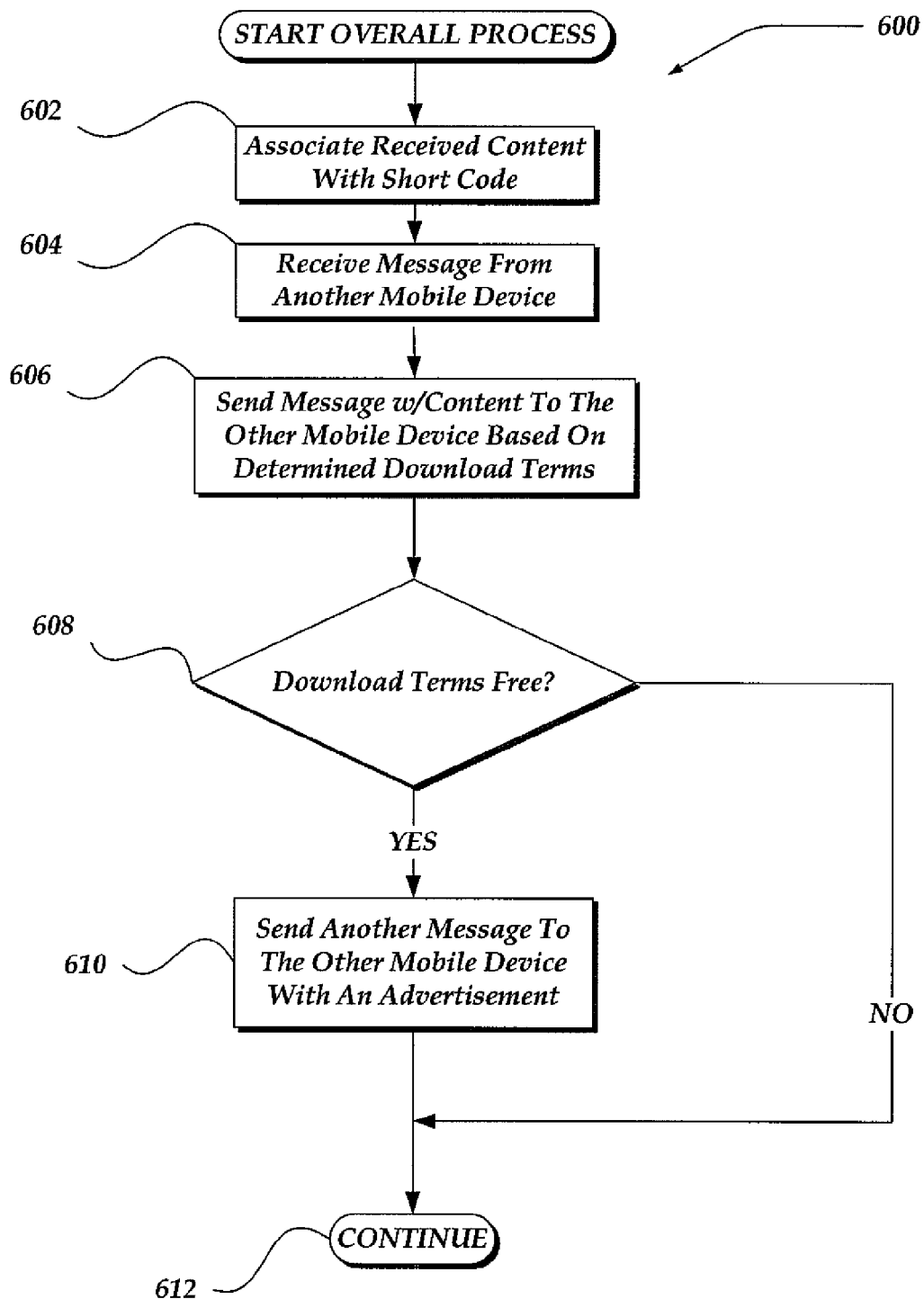
FIG. 6 illustrates a logical flow diagram generally showing example functions that can be performed in addition to the blocks of FIG. 4.

FIG. 6 illustrates example functions that can be implemented in addition to those of FIGS. 4-5, for example including downloading previously uploaded content. As shown in FIG. 6, in block 602 received content (e.g. mobile media content) is associated with a short code. This can be performed, for example, as part of block 452 of FIG. 4.

In FIG. 6, control proceeds from block 602 to block 604, where a message is received from an other client device such as a mobile device, that requests content. For example, this request message can include the short code and/or keywords that together identify a particular media content, so that in a next block 606 the content or a link to the content or other enabling mechanism is sent back to the other client device in accordance with determined download terms for the content, so that the other client device can access the requested content. For example, if the terms indicate a fixed fee for the download, then the other mobile device is invited to provide payment information, or the fixed fee is debited against a known account associated with the mobile device. Other mechanisms and payment structures can be honored and implemented, as variously described herein. Control proceeds from block 606 to block 608, where a determination is made, whether the download terms are free. If not, then control proceeds to block 612, where the process ends, continues by returning to block 602, or continues to other functions. If in block 608 the determination is YES, then control proceeds from block 608 to block 610. In block 610, a second message containing an advertisement is sent to the other mobile device. This advertisement can be related or unrelated to the content (e.g. video content) that preceded, and where information regarding the downloading user is known, can be related to information regarding the user, for example consistent with observed or stated preferences of the user. From block 610, control proceeds to block 612.

Figure 7:
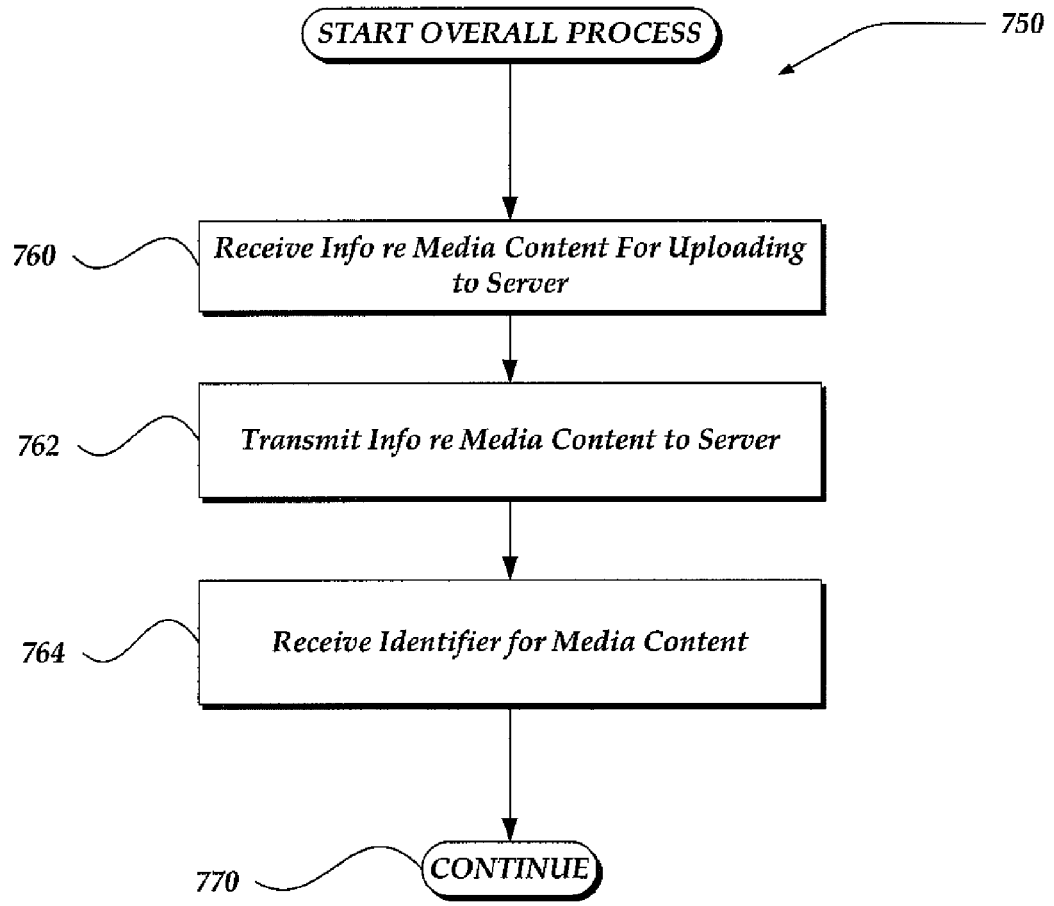
FIG. 7 illustrates a logical flow diagram of an example embodiment from a perspective of a client device.

FIG. 7 illustrates a logical flow diagram 750 of an example embodiment from a perspective of a client device such as a mobile telephone or other device, for example any of the devices 101, 102, 103, 104. Control begins with block 760, wherein the client device receives information from a user (e.g., via keypad entry or other method) regarding media content that is to be uploaded to a server, for example the PBTS system described herein. The information can include, for example, an identification of the media content (which can be audio content, visual content, audiovisual content, and so forth), optionally an indication of a location of the media content (e.g., where the server can obtain the content, if not directly from the client device), one or more key words to associate with the content, a selection or specification of download or payment terms that the user desires to apply to requests for download of the content from the server by third parties, password and/or identification information relating to an account of the user with the server so that the content can be associated with the user, information such as explanatory or advertisement text or other information that is to be provided with the content when it is later downloaded from the server, and so forth as variously described herein.

Control proceeds from block 760 to block 762, where the client device transmits the information (and optionally the media content, such as video) to the server. Information transmitted in block 762 can also include information or a selection with respect to download and/or upload terms to be applied to or associated with the media content. Control then proceeds from block 762 to block 764, where the server returns at least an identifier for the uploaded media content to the client device, as well as any other appropriate information relating to the user, the media content, and/or an account of the user with the server. The identifier can include, for example, a combination of a keyword (selected e.g. by the user and/or the server) and a short code. Control then proceeds to block 770, where the process continues on to various other functions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Below is example source code to perform some of the functions described herein.

Pocket Broadcast, Script for Getting User Input, Populating DB

```
-- Applescript Source
-- Calculate media Reponse Fee
set perKFee to 5.0E-4 -- (value = .0005 or about 50 cents per meg)
set contentLoc to ""
set contentName to ""
set contentSize to 0
set formattedDeliveryFee to 0
set smsAddress to "pckt@mac.com"
tell application "Finder"
    set contentLoc to (choose file)
    set contentName to the name of contentLoc
    set contentSize to the size of contentLoc
    set contentK to contentSize / 1024
    set deliveryFee to (contentK * perKFee)
    set formattedDeliveryFee to "USD $" & my round_truncate(deliveryFee, 2)
end tell
-- Get user's entries in UI and populate database with them
tell application "FileMaker Pro"
    save the current record
    tell document "videotags.fp7"
        tell window 1
            tell layout "buytags"
                set the contents of field "responseMedia" of the current record to contentName
                set the contents of field "mediaSize" of the current record¬
                    to my comma_delimit(contentSize) & "bytes"
                set the contents of field "responseMediaLoc" of the current record to contentLoc as string
                set the contents of field "mediaDeliveryFee" of the current record to formattedDeliveryFee
                set the contents of field "responseMessagePreview" of the current record¬
                    to the contents of field "response.content" of the current record¬
                    & return & "rtsp://dss5.streamhoster.com/pckt/" & contentName
                set the contents of field "txtTrigger" of the current record¬
                    to the contents of field "keyword" of the current record
                set the contents of field "smsAddr" of the current record to smsAddress
                set the contents of field "fromAddrDisplay" of the current record to smsAddress
                set the contents of field "responseSubjectDisplay" of the current
```

-continued record to the contents of field "response.subject" of the current record
                end tell
            end tell
        end tell
end tell
activate application "FileMaker Pro"

Pocket Broadcast, Script for Evaluating an Incoming SMS for Keywords, Determining Response

```
-- Applescript Source
-- Get information for reply from email being evaluated by rule invoking this script
using terms from application "Mail"
    on perform mail action with messages theMessages for rule theRule
        tell application "Mail"
            repeat with eachMessage in theMessages
                try
                    -- display dialog "Trying" buttons {"OK"} default button 1
                    set theOriginalContent to the content of eachMessage
                    -- display dialog "Content received: " & theOriginalContent buttons {"OK"} default button 1
                    set theRecipient to sender of eachMessage
                    -- display dialog "Was sent by: " & theRecipient buttons {"OK"} default button 1
                    set thisKey to my isKeyIn(theOriginalContent)
                    if thisKey = 0 then
                        set theSubject to "Recent Query"
                        set theContent to "Sorry. We don't have info re:" & return & return & theOriginalContent & return & "Please text tags -- keywords relating to the subject."
                    else
                        set theSubject to my getResponse("response.subject", thisKey)
                        set theContent to my getResponse("response.content", thisKey) & return & ¬
                            "rtsp://dss5.streamhoster.com/pckt/" & my getResponse("responseMedia", thisKey)
                    end if
                    set newMessage to make new outgoing message with properties ¬
                        {subject:theSubject, content:theContent & return}
                    tell newMessage
                        set sender to "pckt@mac.com"
                        make new to recipient with properties {address:theRecipient}
                    end tell
                    send newMessage
                    -- display dialog "Finished Trying" buttons {"OK"} default button 1
                end try
            end repeat
        end tell
    end perform mail action with messages
end using terms from
--- Subroutines ---
on isKey(someWord) -- returns either 0 or, if someWord turns out to be a keyword, its record #
    tell application "FileMaker Pro"
        set theRecord to 0
        set numRecords to count of records
        set possibleKeyWords to the contents of field "keyword" -- optimizes to one db call, rather than rec by rec search
        repeat with i from 1 to numRecords
            if theRecord is 0 then
                if someWord = item i in possibleKeyWords then
                    set theRecord to i
                end if
            end if
        end repeat
    end tell
    return theRecord
end isKey
on isKeyIn(someContent) -- returns # of keyword record, or 0 if no keyword found in someContent
    tell application "FileMaker Pro"
        set theKeyRecord to 0
        set numWords to count words in someContent
        repeat with i from 1 to numWords
            if theKeyRecord is 0 then -- will continue to test if no keyword record was
```

```
found
                set theKeyRecord to my isKey(word i in someContent)
            end if
        end repeat
    end tell
    return theKeyRecord
end isKeyIn
on getResponse(fieldName, recordNum) -- returns response text according to fieldName
    tell application "FileMaker Pro"
        if not recordNum = 0 then
            return the contents of field fieldName of record recordNum
        else
            return "null"
        end if
    end tell
end getResponse
```

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method of providing mobile media content over a network, comprising:
   receiving, from a mobile device that is employed as a content contributor, mobile media content, information associated with the mobile media content, and a selection of at least one monetization option to associate with at least one of download terms or upload terms of the mobile media content;
   associating the received mobile media content with at least one key word based on the associated information, the at least one key word being combined with an address, the combination being arranged to be provided via an advertisement or in response to a search query;
   determining the at least one of download terms or upload terms for the mobile media content for at least one mobile device or a network device based on at least the associated information;
   associating the received mobile media content with a Short Message Service (SMS) short code to uniquely identify the mobile media content;
   receiving a message from an other mobile device wherein the message comprises the at least one key word and the associated SMS short code;
   based on the received message and the determined terms, sending a message to the other mobile device wherein the sent message comprises a link to the received mobile media content that enables the other mobile device to access the content absent registration to access the content, and to further share the content with at least a third mobile device, wherein the content is shared with different access rights than for the other mobile device.

2. The method of claim 1, comprising:
   based on the determined terms for the mobile media content, sending another message to the other mobile device comprising the advertisement associated with the mobile media content.

3. The method of claim 2, wherein the message from the other mobile device corresponds to a particular advertisement or venue observed by a user of the other mobile device, and wherein the other message sent to the other mobile device is determined based on the particular observed advertisement or venue.

4. The method of claim 1, wherein the key word indicates the advertisement that refers to the mobile media content.

5. The method of claim 1, wherein the receiving comprises:
   receiving at least one key word; and
   receiving a message to accompany the mobile media content if the mobile media content is communicated to an other mobile device.

6. The method of claim 1, wherein a first group of users and a second group of users are assigned different monetization options.

7. A non-transitory processor readable medium that includes data and instructions, wherein the execution of the instructions provides for mobile media content over a network by enabling actions, comprising:
   receiving, from a mobile device that is employed as a content contributor, mobile media content, information associated with the mobile media content, and a selection of at least one monetization option to associate with at least one of download terms or upload terms of the mobile media content;
   associating the received mobile media content with at least one key word based on the associated information, the at least one key word being uniquely combined with an address, the combination being arranged to be provided via an advertisement or in response to a search query;
   determining the at least one of download terms or upload terms for the mobile media content for at least one mobile device or a network device based on at least the associated information;
   associating the received mobile media content with an address to uniquely identify the mobile media content;
   receiving a message from an other mobile device wherein the message comprises the at least one key word and the associated address;
   based on the received message and the determined terms, sending a message to the other mobile device wherein the sent message comprises a link to the received mobile media content that enables the other mobile device to access the content absent registration to access the content, and to further share the content with at least a third mobile device, wherein the content is shared with different access rights than for the other mobile device.

8. The medium of claim 7, wherein the key word indicates an advertisement that refers to the mobile media content.

9. The medium of claim 7, wherein the receiving comprises:
   receiving at least one key word; and
   receiving a communication to accompany the mobile media content if the mobile media content is communicated to an other mobile device.

10. A network device arranged to provide for mobile media content over a network by enabling actions, comprising:
- a transceiver to communicate over the network with at least one mobile device; and
- a processor that is arranged to enable actions, including:
  - receiving, from a mobile device that is employed as a content contributor, mobile media content, information associated with the mobile media content, and a selection of at least one monetization option to associate with at least one of download terms or upload terms of the mobile media content;
  - associating the received mobile media content with at least one key word based on the associated information, the at least one key word being uniquely combined with an address, the combination being arranged to be provided via an advertisement or in response to a search query;
  - determining the at least one of download terms or upload terms for the mobile media content for at least one mobile device or another network device based on at least the associated information;
  - associating the received mobile media content with a Short Message Service (SMS) short code to uniquely identify the mobile media content;
  - receiving a message from an other mobile device wherein the message comprises the at least one key word and the associated SMS short code;
  - based on the received message and the determined terms, sending a message to the other mobile device wherein the sent message comprises a link to the received mobile media content that enables the other mobile device to access the content absent registration to access the content, and to further share the content with at least a third mobile device, wherein the content is shared with different access rights than for the other mobile device.

11. The network device of claim 10, wherein the key word indicates an advertisement that refers to the mobile media content.

12. The network device of claim 10, wherein the actions further comprise:
- receiving a communication from the other mobile device requesting the mobile media content;
- sending another communication to the other mobile device wherein the sent other communication comprises a link to the mobile media content; and
- sending yet another communication to the other mobile device comprising an advertisement associated with the mobile media content.

13. The network device of claim 10, wherein the associated information comprises a Short Message Service (SMS) short code uniquely associated with a provider of the mobile media content.

14. The network device of claim 10, wherein the associated information comprises:
- at least one key word;
- a communication arranged to accompany the mobile media content if the mobile media content is communicated to an other mobile device; and
- a selection of at least one monetization option to associate with the at least one of download terms or upload terms of the mobile media content.

15. The network device of claim 10, wherein the network device is arranged to operate as at least one of a server, a client, a peer, a wired computing device, or another mobile device.

16. A system that provides mobile media content over a network, comprising:
- a network device that includes:
- a transceiver for communicating with at least one mobile device; and
- a processor for enabling actions, comprising:
  - receiving, from a mobile device that is employed as a content contributor, mobile media content, information associated with the mobile media content, and a selection of at least one monetization option to associate with at least one of download terms or upload terms of the mobile media content;
  - associating the received mobile media content with at least one key word based on the associated information, the at least one key word being uniquely combined with an address, the combination being arranged to be provided via an advertisement or in response to a search query;
  - determining the at least one of download terms or upload terms for the mobile media content by at least one mobile device or another network device based on at least the associated information;
- associating the received mobile media content with an address to uniquely identify the mobile media content;
- receiving a message from an other mobile device wherein the message comprises the at least one key word and the associated address;
- based on the received message and the determined terms, sending a message to the other mobile device wherein the sent message comprises a link to the received mobile media content that enables the other mobile device to access the content absent registration to access the content, and to further share the content with at least a third mobile device, wherein the content is shared with different access rights than for the other mobile device; and
- the mobile device that further includes:
  - a transceiver for communicating with at least the network device over the network; and
  - a processor for enabling actions, comprising:
    - communicating mobile media content with at least the network device; and
    - downloading requested mobile media content from at least the network device.

17. The system of claim 16, wherein the network device enables further actions, including:
- receiving at least one key word;
- receiving a communication to accompany the mobile media content if the mobile media content is communicated to an other mobile device; and
- receiving a selection of at least one monetization option to associate with the at least one of download terms or upload terms of the mobile media content.

* * * * *